Aug. 21, 1951         W. C. ALEXANDER         2,564,828
WHEELED GOLF CLUB CARRIER
Filed Feb. 24, 1949                                    3 Sheets-Sheet 1
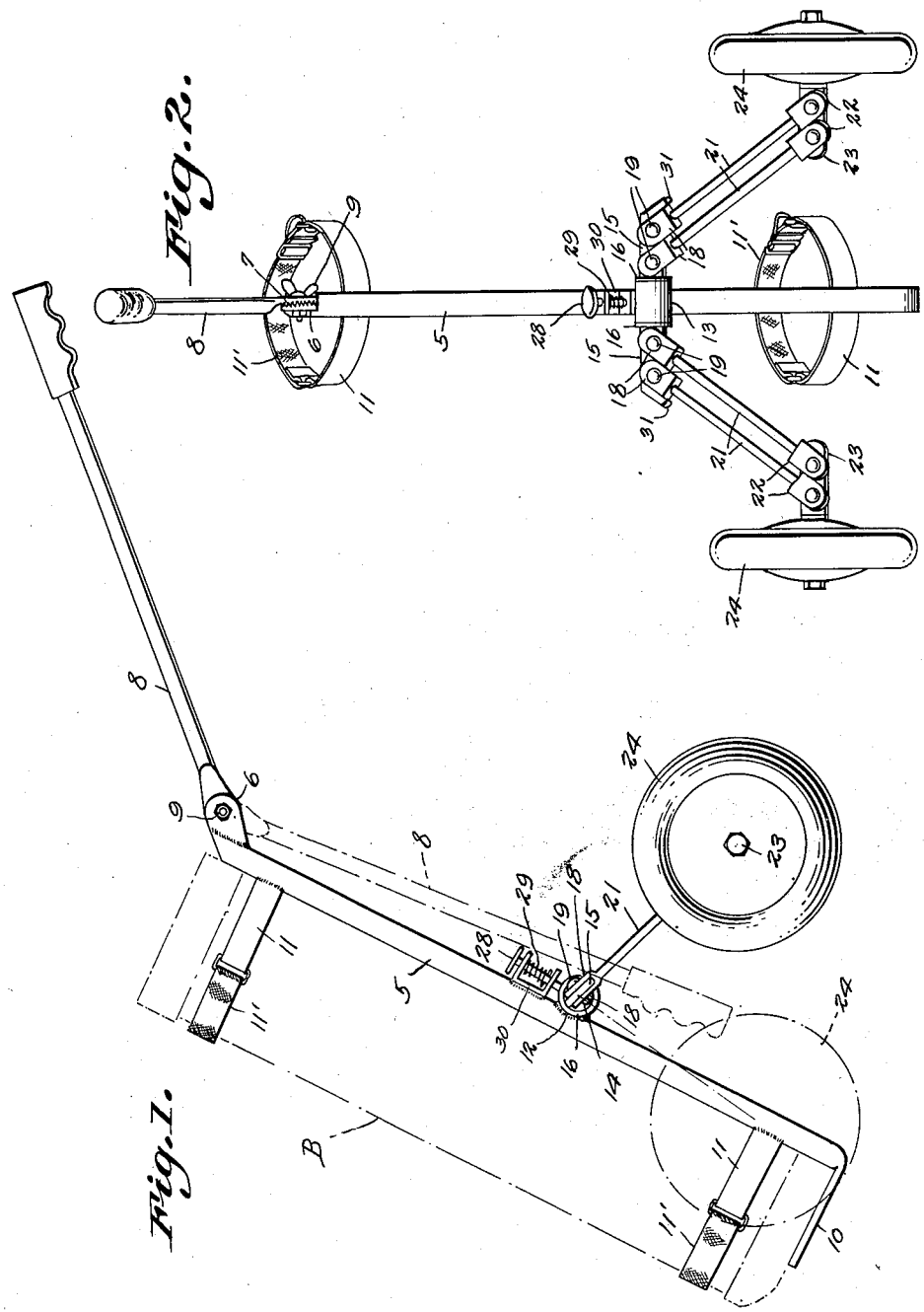
W. C. Alexander INVENTOR
BY
ATTORNEYS.

Aug. 21, 1951  W. C. ALEXANDER  2,564,828
WHEELED GOLF CLUB CARRIER
Filed Feb. 24, 1949  3 Sheets-Sheet 2
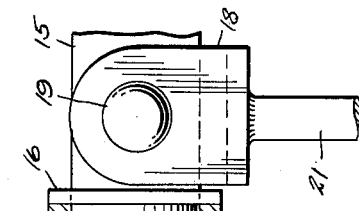
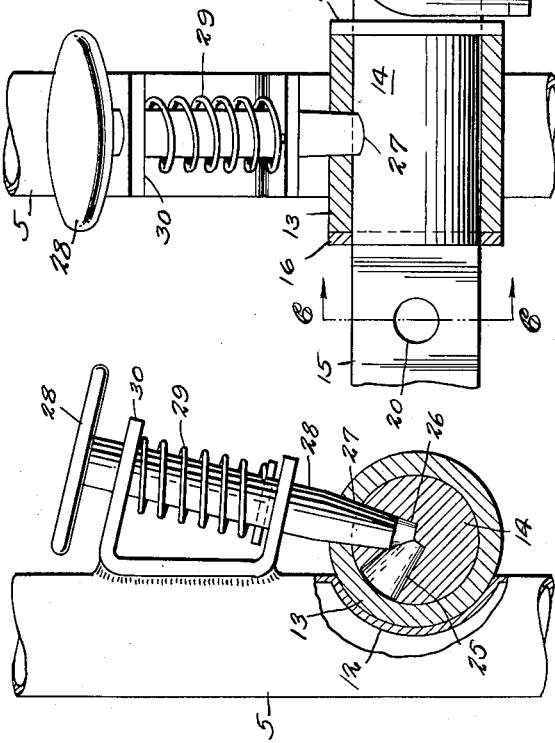
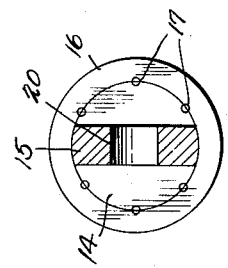
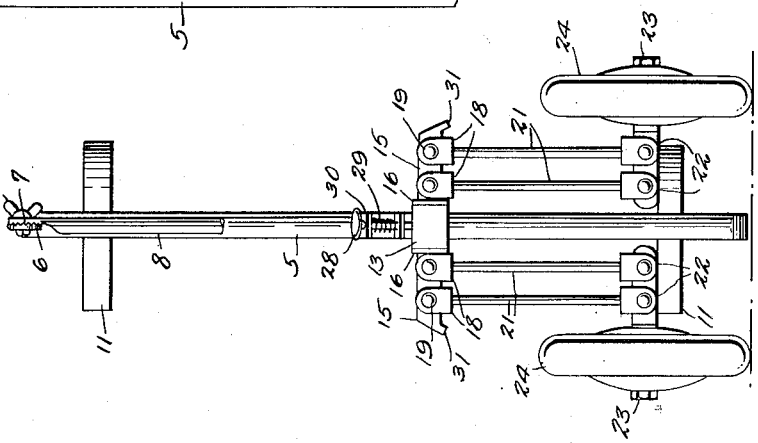
W. C. Alexander
INVENTOR
BY *[signature]*
ATTORNEYS.

Aug. 21, 1951 W. C. ALEXANDER 2,564,828
WHEELED GOLF CLUB CARRIER
Filed Feb. 24, 1949 3 Sheets-Sheet 3
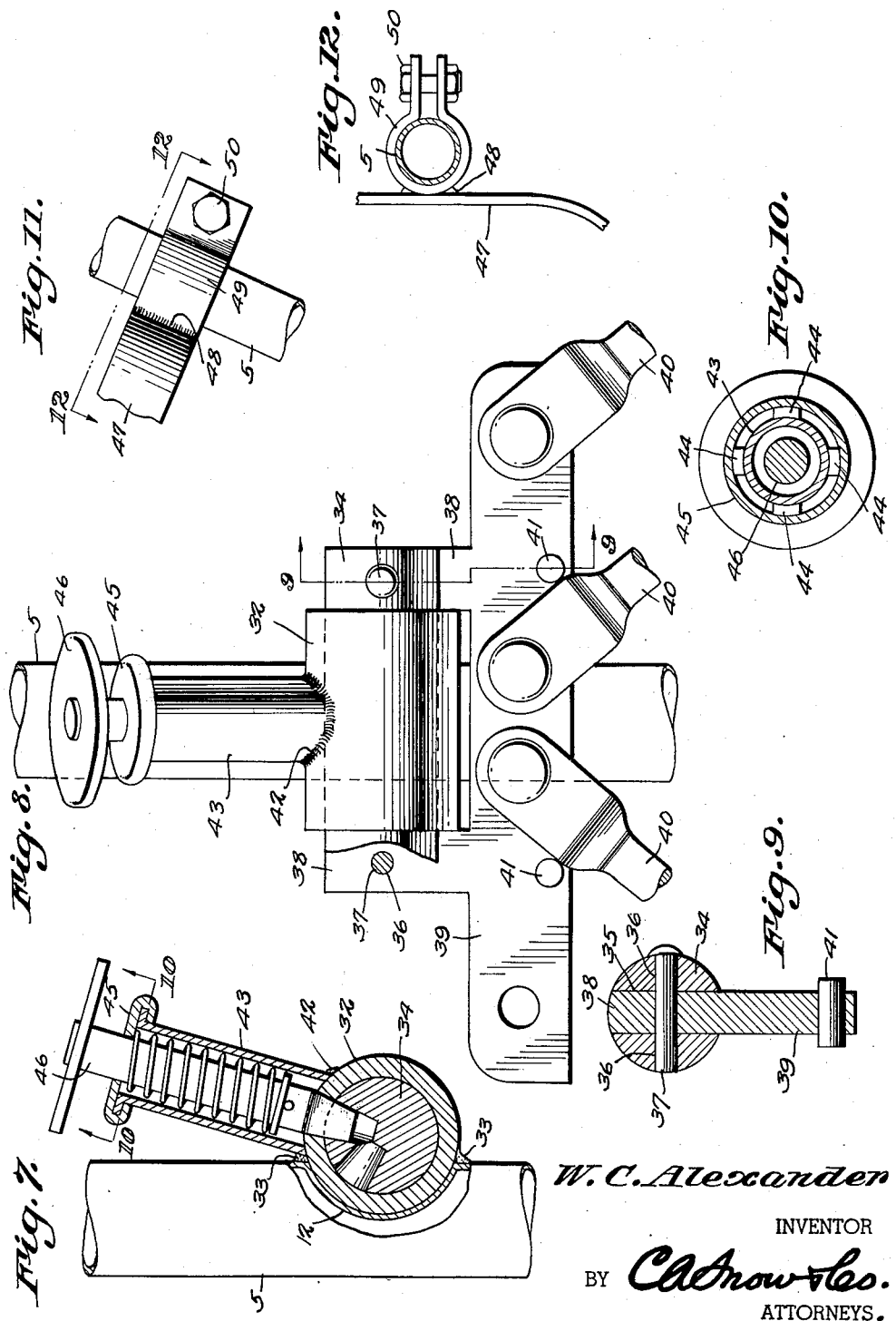
W. C. Alexander
INVENTOR
BY C. A. Snow & Co.
ATTORNEYS.

Patented Aug. 21, 1951

2,564,828

UNITED STATES PATENT OFFICE 2,564,828

WHEELED GOLF CLUB CARRIER

William C. Alexander, Port Arthur, Tex.

Application February 24, 1949, Serial No. 78,187

1 Claim. (Cl. 280—38)

This invention relates to a caddie cart.

An important object of the invention is to provide a caddie cart which can be folded into a minimum space, so as to be conveniently packed away in a locker or in the back of a car.

Another important object is to provide a caddie cart which will be light, durable, readily set up for use, and capable of being locked both in its set up and collapsed positions.

Another important object is to provide a caddie cart which, considering its advantages, will nevertheless be capable of manufacture at no greater cost than other caddie carts not embodying similar advantages.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is a side elevational view, the dotted lines indicating a collapsed position.

Fig. 2 is a rear elevational view.

Fig. 3 is a rear elevational view of the collapsed cart.

Fig. 4 is an enlarged fragmentary detail section taken transversely through a locking means.

Fig. 5 is an enlarged fragmentary detail section taken longitudinally through said means.

Fig. 6 is a section on line 6—6 of Fig. 5.

Fig. 7 is a view similar to Fig. 4 showing a modified form of locking means.

Fig. 8 is a fragmentary rear elevation, showing a modified connection of wheel frame to main frame.

Fig. 9 is a section substantially on line 9—9 of Fig. 8.

Fig. 10 is a section on line 10—10 of Fig. 7.

Fig. 11 is a fragmentary side elevation of a modified golf bag support.

Fig. 12 is a section on line 12—12 of Fig. 11.

Referring to the drawings in detail, a main frame 5 in the present instance comprises a single length of metal tubing the upper end of which is flattened and extended rearwardly at an angle to provide an ear 6 one surface of which is formed with radial ribs or teeth 7 adapted to interengage with correspondingly formed teeth on the inner end of an elongated handle 8. A connecting means 9 here shown as a wing bolt joins the handle and main frame together.

From the construction which has so far been described, it will be seen that the handle 8 is adapted to be collapsed to the dotted line position illustrated in Fig. 1, relative to the main frame 5. Or, it can be extended to the full line position illustrated in Figs. 1 and 2, simply by loosening the means 9. After the handle 8 has been adjusted to any desired rearwardly extended position, as for example, the full line position of Fig. 1, the means 9 can be tightened with the teeth interengaging to prevent relative movement between main frame 5 and handle 8 after the adjustment is made.

At its lower end, the main frame 5 is flattened and extended forwardly to provide a rest 10 for the lower end of a golf bag B. At spaced intervals longitudinally of the main frame, forwardly extended arcuate metal supports 11 are welded to the main frame, and to the free ends of these supports 11 are connected flexible straps 11'. The parts 11, 11' and 10 together cooperate to provide a means for holding the golf bag removably but firmly in a supported position upon the main frame 5.

Intermediate its ends, the main frame 5 is recessed as at 12 (Fig. 4) and welded into the recess is a transversely extended sleeve 13 in which is rotatable the shaft 14 having flattened ends 15 extended laterally of the main frame.

To prevent lengthwise movement of shaft 14 and its extensions 15, there are provided the collars 16, said collars or rings 16 being peened upon the shaft 14 and abutting against the ends of the sleeve 13. The peening of the rings to the shaft is designated at 17. Of course, other means of preventing lengthwise movement of the shaft while yet permitting free rotation thereof within the sleeve 13 can be provided.

Pivoted to each extension 15 is a pair of yokes 18, said yokes being joined to the extensions 15 by rivets 19 passing through openings 20 formed in said extensions. The yokes are carried at the upper ends of rods 21, and secured to the lower ends of said rods are lower yokes 22 formed like the upper yokes 18. These are pivoted to spindles or stub shafts 23 that carry wheels 24.

I provide a means for locking the wheel frame represented by parts 14, 15, 21, 23, and 24 and associated parts, against movement from adjusted positions to which pivotally swung upon the main frame. To this end, tapered recesses 25, 26 (Fig. 4) are formed in the shaft 14, and a tapered aperture 27 is formed in the sleeve 13. A detent 28 has its inner end tapered correspondingly, the outer end of the detent being formed as a disc-like handle. Said detent 28 is spring pressed inwardly so as to be normally retained either in the recess 25 or the recess 26, by a spring 29, and the detent is mounted for reciprocating movement in a yoke 30 welded to the main frame.

At the ends of the extensions 15, there are formed integrally therewith downwardly extended stops 31 that are adapted to engage the outermost upper yokes 18, so as to limit outward swinging movement thereof beyond the position illustrated in Fig. 2.

I believe the operation of the caddie cart does not require detailed description. First, the caddie cart can be folded to the position illustrated in dotted lines in Fig. 1 and in full lines in Fig. 3. In this position of the parts, the wheel frame is first compressed widthwise from the position illustrated in Fig. 2 to the position illustrated in Fig. 3. This is permitted by the pivoted construction wherein the rods 21 are pivoted at their upper ends to the extensions 15, and at their lower ends to the spindles 23. Then, the compressed wheel frame is pivotally swung as a unit towards the main frame 5, so that the wheels 24 move from the full line position illustrated in Fig. 1, to the dotted line position illustrated in the same figure.

Then, the handle 8 is adjusted to the dotted line position illustrated.

When the parts have been all moved to their collapsed positions, they will be retained or locked in said positions first, because the detent 28 will now engage in the locking recess 25, while the handle 8 can be locked in collapsed position by means 7, 9.

To set the caddie cart up for use, the operation is reversed. First, the handle is adjusted to any rearwardly extended position desired. Then, detent 28 is pulled outwardly against the action of the spring, so as to be adjusted to recess 26. Then, by expanding the wheel frame widthwise, the device is ready for use as illustrated in Fig. 1.

In Figures 7 to 10, a modified form of locking means and connection of the wheel frame to the main frame is illustrated. A sleeve 32 is welded at 33 in the recess 12 of the main frame 5, and rotatable in the sleeve is the shaft 34 circular in cross section from end to end.

Shaft 34 has ends projecting beyond the ends of sleeve 32 as seen from Fig. 8, and these projecting ends are slotted inwardly at 35 so as to provide a fork at each end of the shaft. The arms of each fork have registering apertures 36 receiving pins 37 whereby to pin to the forks the spaced parallel tongues 38 that extend into the slot 35 and are formed integral with the transversely disposed flat bar 39. Bar 39 is thus swung toward or away from the main frame 5 in use of the device as hereinbefore described, said bar swinging with rotation of shaft 34 in sleeve 32.

Pivotally connected to the bar 39 are the rods 40 to which the wheels are connected as hereinbefore described. Outward movement of rods 40 is limited by lugs 41 mounted in the bar 39.

Welded at 42 to the sleeve 32 is the cylinder 43 having outturned ears 44 integrally formed on its upper end. A cap 45 for the cylinder has a depending peripheral flange inturned around the ears 44, and reciprocating in the cap and cylinder is the detent 46 spring urged into a selected locking recess in the shaft 34, in the same manner as the locking means of Fig. 4.

Referring to the showing of Figs. 11 and 12, there is here illustrated a modified form of upper support for the golf bag B. In the first form of the invention this upper support, designated 11, is fixedly secured to the main frame 5. However, in the form of the invention as shown in Figs. 11 and 12, I provide for adjustment of the upper golf bag supporting means longitudinally of the main frame 5, thus to accommodate golf bags of different sizes. To this end, a bag supporting metal strap 47 is welded at 48 to a split sleeve clamp 49, fastening means 50 being used to secure the clamp 49 against movement relative to the main frame 5, after adjustment of said clamp 49 longitudinally of the main frame.

What is claimed is:

A caddie cart comprising a main frame in the form of an elongated piece of metal tubing, a sleeve extended transversely of said tubing intermediate the ends of the tubing, a shaft rotatable in the sleeve, a detent carried by the sleeve, the shaft having a pair of closely spaced radial detent-receiving openings, said detent and openings constituting means for locking the shaft to the sleeve in each of two positions to which the shaft is rotated within the sleeve, rods pivotally connected to the shaft, wheel spindles pivotally connected to the rods, wheels carried by the spindles, and a handle adjustably connected to the main frame, one of said positions being a position in which the rods are collapsed against the main frame and the other position being a position in which the rods extend obliquely from the main frame, the rods extending toward the lower end of the main frame in their first-named position and extending away from the main frame in their second-named position.

WILLIAM C. ALEXANDER.

REFERENCES CITED

The following references are of record in the file of this patent:

UNITED STATES PATENTS

| Number | Name | Date |
| --- | --- | --- |
| 2,124,265 | Sinnott | July 19, 1938 |
| 2,326,482 | Moffitt | Aug. 10, 1943 |
| 2,406,183 | Allen | Aug. 20, 1946 |
| 2,415,392 | Morehouse | Feb. 4, 1947 |
| 2,442,620 | Simpson | June 1, 1948 |
| 2,443,847 | Williamson | June 22, 1948 |
| 2,506,601 | Kelch | May 9, 1950 |